US012639578B2

(12) United States Patent (10) Patent No.: US 12,639,578 B2
Zografos (45) Date of Patent: May 26, 2026

(54) SYSTEMS, METHODS, AND MEDIA FOR VEHICLE TRACKING IN PARKING AREAS

(71) Applicant: Streetline Technology LLC, San Mateo, CA (US)

(72) Inventor: Anastasios Zografos, San Mateo, CA (US)

(73) Assignee: Streetline Technology LLC, San Mateo, CA (US)

( * ) Notice: Subject to any disclaimer, the term of this patent is extended or adjusted under 35 U.S.C. 154(b) by 0 days.

(21) Appl. No.: 18/497,725

(22) Filed: Oct. 30, 2023

(65) Prior Publication Data

US 2024/0144731 A1 May 2, 2024

Related U.S. Application Data

(60) Provisional application No. 63/421,440, filed on Nov. 1, 2022, provisional application No. 63/421,446, filed on Nov. 1, 2022.

(51) Int. Cl.
*G06Q 10/02* (2012.01)
*G01C 21/36* (2006.01)
(Continued)

(52) U.S. Cl.
CPC ......... *G06N 3/084* (2013.01); *G01C 21/3685* (2013.01); *G06Q 10/02* (2013.01);
(Continued)

(58) Field of Classification Search
CPC .... G06N 3/084; G01C 21/3685; G06Q 10/02; G06Q 20/14; G07B 15/02; G07C 5/008; G07C 5/0808
(Continued)

(56) References Cited

U.S. PATENT DOCUMENTS 9,571,985 B2 * 2/2017 Bottazzi ................ H04W 4/023
10,957,200 B1 * 3/2021 Ledet .................... G08G 1/144
(Continued)

FOREIGN PATENT DOCUMENTS

CN 106710293 A * 5/2017 ............. G08G 1/146
KR 20200036071 A * 4/2020 ............. B60R 25/10

OTHER PUBLICATIONS

Prajith M.S, "Intelligent Parking System—How Does it Work", May 1, 2022, becomap.com, 9 pages. (Year: 2022).*
(Continued)

*Primary Examiner* — Daniel Vetter
*Assistant Examiner* — Freda A Nelson
(74) *Attorney, Agent, or Firm* — Carr & Ferrell LLP; K. Brian Bathurst

(57) ABSTRACT

Exemplary embodiments include systems and methods for pairing a user to an available parking space, the system comprising: a positional device; at least one sensory input device positioned on an infrastructure point located proximally to at least one parking space; and a central server platform comprising a server having a processor and a memory unit communicatively coupled with the processor, the memory unit storing instructions which, when executed, perform a method. The method comprises: receiving a first signal from the positional device, the first signals indicating an intention of a user to seek parking and further indicating a location of the user; receiving a second signal from the at least one sensory input device, the second signal indicating availability of a parking space; determining, from the second signal, which of the parking spaces are available to the user; and pairing the user with a parking space.

20 Claims, 14 Drawing Sheets

(51) Int. Cl.

| | |
|---|---|
| *G06N 3/084* | (2023.01) |
| *G07B 15/02* | (2011.01) |
| *G07C 5/00* | (2006.01) |
| *G07C 5/08* | (2006.01) |
| *G06Q 20/14* | (2012.01) |

(52) U.S. Cl.
CPC .............. *G07B 15/02* (2013.01); *G07C 5/008* (2013.01); *G07C 5/0808* (2013.01); *G06Q 20/14* (2013.01)

(58) Field of Classification Search
USPC ............................................................ 705/5
See application file for complete search history.

(56) References Cited

U.S. PATENT DOCUMENTS

| | | | | |
|---|---|---|---|---|
| 2017/0004710 | A1* | 1/2017 | Dozono | G07F 17/24 |
| 2018/0039974 | A1* | 2/2018 | Powell | G08G 1/144 |
| 2018/0186309 | A1* | 7/2018 | Batten | G09G 3/36 |
| 2018/0357899 | A1* | 12/2018 | Krivacic | G08G 1/14 |
| 2023/0177840 | A1* | 6/2023 | Telpaz | B60R 16/0231 |
| 2024/0144016 | A1 | 5/2024 | Zografos et al. | |
| 2026/0038276 | A1 | 2/2026 | Zografos | |

OTHER PUBLICATIONS

Mithlesh Meena et al., "Frictionless Ticketing for Public Transport—Appendix 1: Technical evaluation", Jul. 2022, Project No. 3-023, The Centre for Technology Infusion, 107 pages (Year: 2022).*

Shilpa Shyam et al., "Vehicle Monitoring and Localization using UWB in Complex Parking Lot", Apr. 7-9, 2022, Proceedings of the International Conference on Sustainable Computing and Data Communication Systems (ICSCDS-2022), 7 pages (Year: 2022).*

Gitlin, Jonatham "97% of drivers want in-car payment system for tolls, parking, charging," Ars Technica [online], Apr. 8, 2025 [retrieved Apr. 9, 2025], Retrieved from the internet: <URL:https://arstechnica.com/cars/2025/04/97-of-drivers-want-in-car-payment-system-for-tolls-parking-charging/>, 5 pages.

* cited by examiner

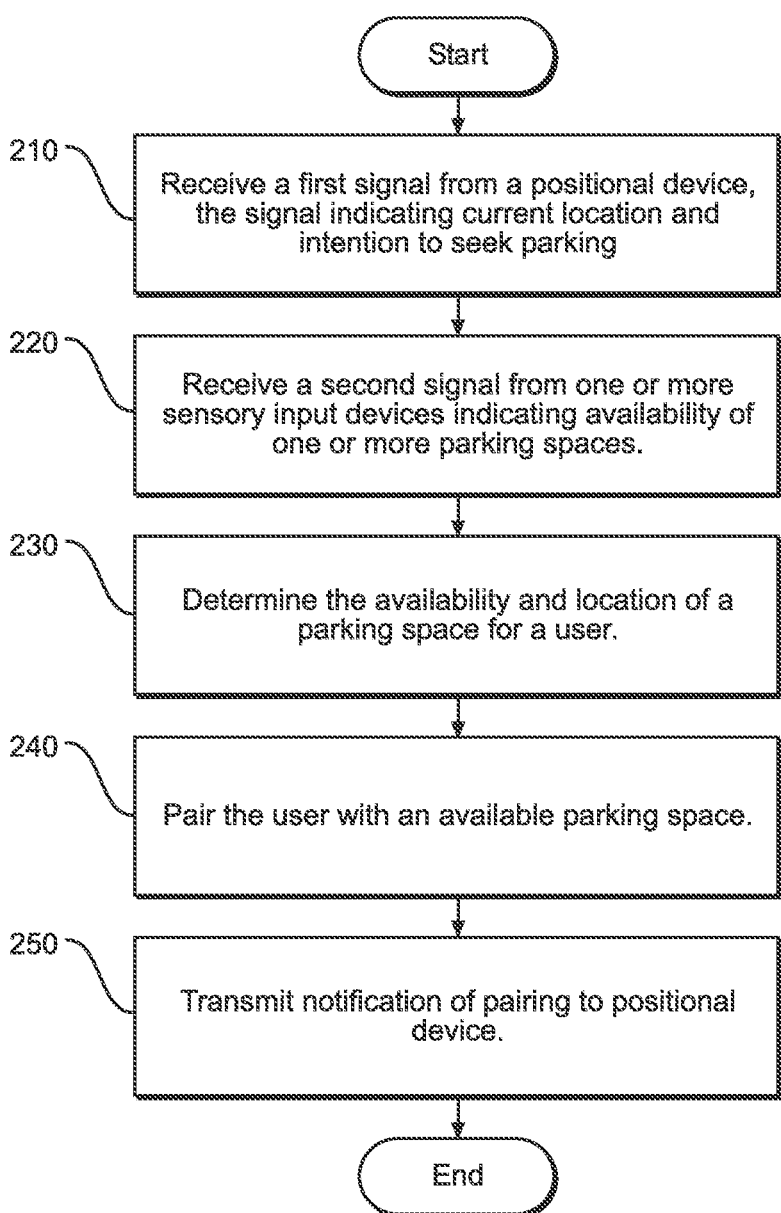

210 Receive a first signal from a positional device, the signal indicating current location and intention to seek parking 220 Receive a second signal from one or more sensory input devices indicating availability of one or more parking spaces.

230 Determine the availability and location of a parking space for a user.

240 Pair the user with an available parking space.

250 Transmit notification of pairing to positional device.

SYSTEMS, METHODS, AND MEDIA FOR VEHICLE TRACKING IN PARKING AREAS

CROSS-REFERENCE TO RELATED APPLICATIONS

The present application claims the priority benefit of U.S. Provisional Patent Application Ser. No. 63/421,440, filed on Nov. 1, 2022, titled "Systems, Methods, and Media for Vehicle Tracking", and further claims the priority benefit of U.S. Provisional Patent Application Ser. No. 63/421,446, filed on Nov. 1, 2022, titled "Systems, Methods, and Media for Vehicle Tracking on a Pre-Defined Course". This application is related to U.S. patent application Ser. No. 18/497,771 filed on Oct. 30, 2023, titled "Artificial Intelligence for Vehicle Performance and Tracking", which claims the priority benefit of U.S. Provisional Patent Application Ser. No. 63/421,440, filed on Nov. 1, 2022, titled "Systems, Methods, and Media for Vehicle Tracking", and further claims the priority benefit of U.S. Provisional Patent Application Ser. No. 63/421,446, filed on Nov. 1, 2022, titled "Systems, Methods, and Media for Vehicle Tracking on a Pre-Defined Course". These applications are hereby incorporated by reference in their entirety, including all appendices.

FIELD OF INVENTION

The present technology pertains to the technical field of communications networks using sensory input devices, and in particular, but not exclusively, to their use in identifying traffic and vehicular parking patterns.

SUMMARY OF EXEMPLARY EMBODIMENTS

This summary is provided to introduce a selection of concepts in a simplified form that are further described in the detailed description below. This summary is not intended to identify key features or essential features of the claimed subject matter, nor is it intended to be used as an aid in determining the scope of the claimed subject matter.

Exemplary embodiments include systems and methods for pairing a user seeking a parking space to an available parking space, the system comprising: at least one positional device located proximally to a user occupying a vehicle; at least one sensory input device positioned on an infrastructure point, the infrastructure point being located proximally to at least one parking space of one or more parking spaces; and a central server platform comprising at least one server having at least one processor and at least one memory unit communicatively coupled with the processor, the at least one memory unit storing instructions which, when executed by the at least one processor, perform a method. The method in such embodiments comprises: receiving a first one or more signals from the at least one positional device, the first one or more signals indicating an intention of a user to seek parking and further indicating a location of the positional device; receiving a second one or more signals from the at least one sensory input device, the second one or more signals indicating an availability of the at least one parking space; determining, from the second one or more signals, which of the one or more parking spaces are available to the user; pairing the user with the at least one parking space; and transmitting a notification of the pairing to the positional device.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
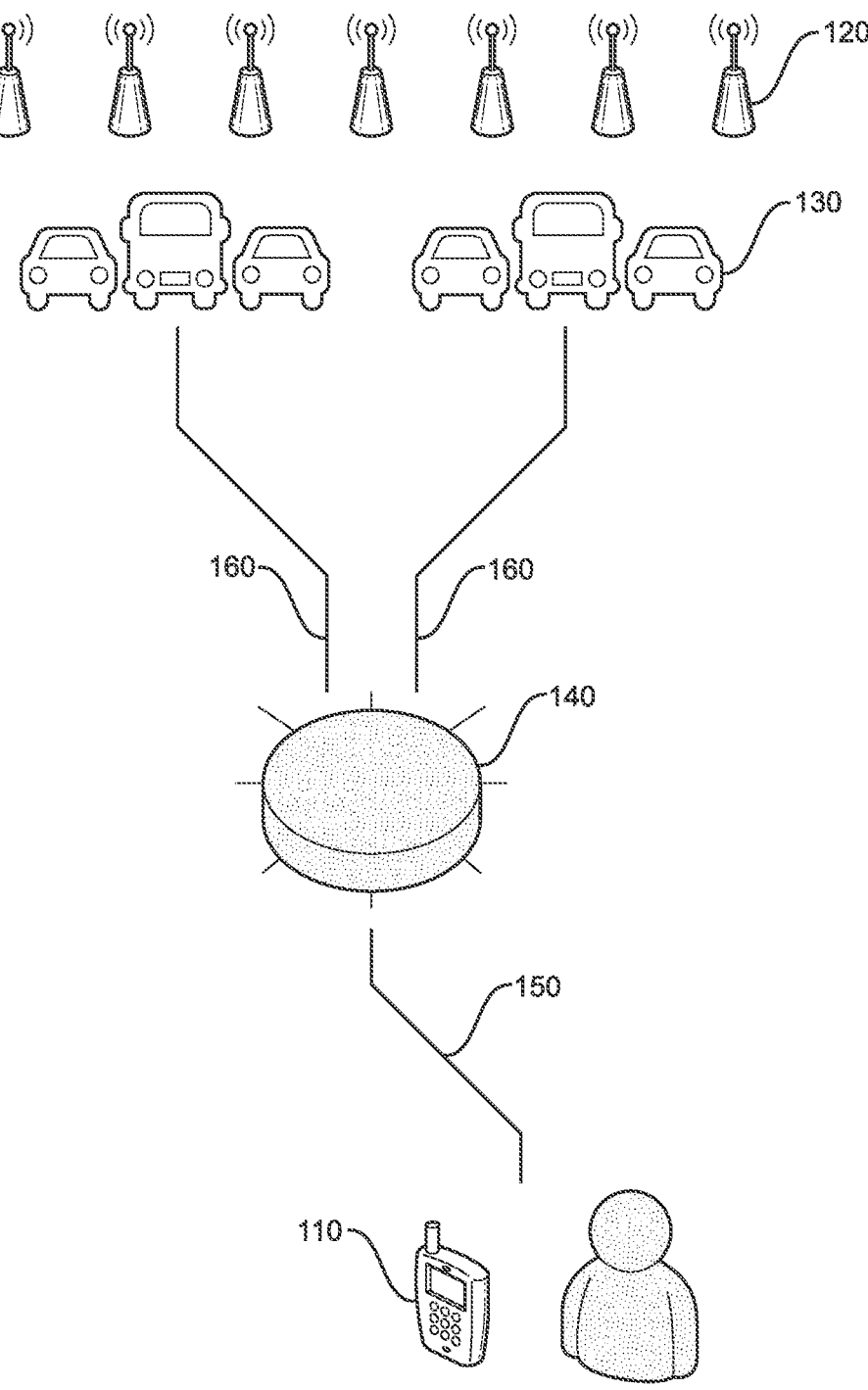

The systems and methods disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 diagrammatically illustrates an exemplary method of the present disclosure.

FIG. 2 diagrammatically illustrates an example system for executing exemplary methods of the present disclosure.

FIGS. 3-6 diagrammatically illustrate an exemplary method for use of an application implementing the present disclosure.

Figure 7:
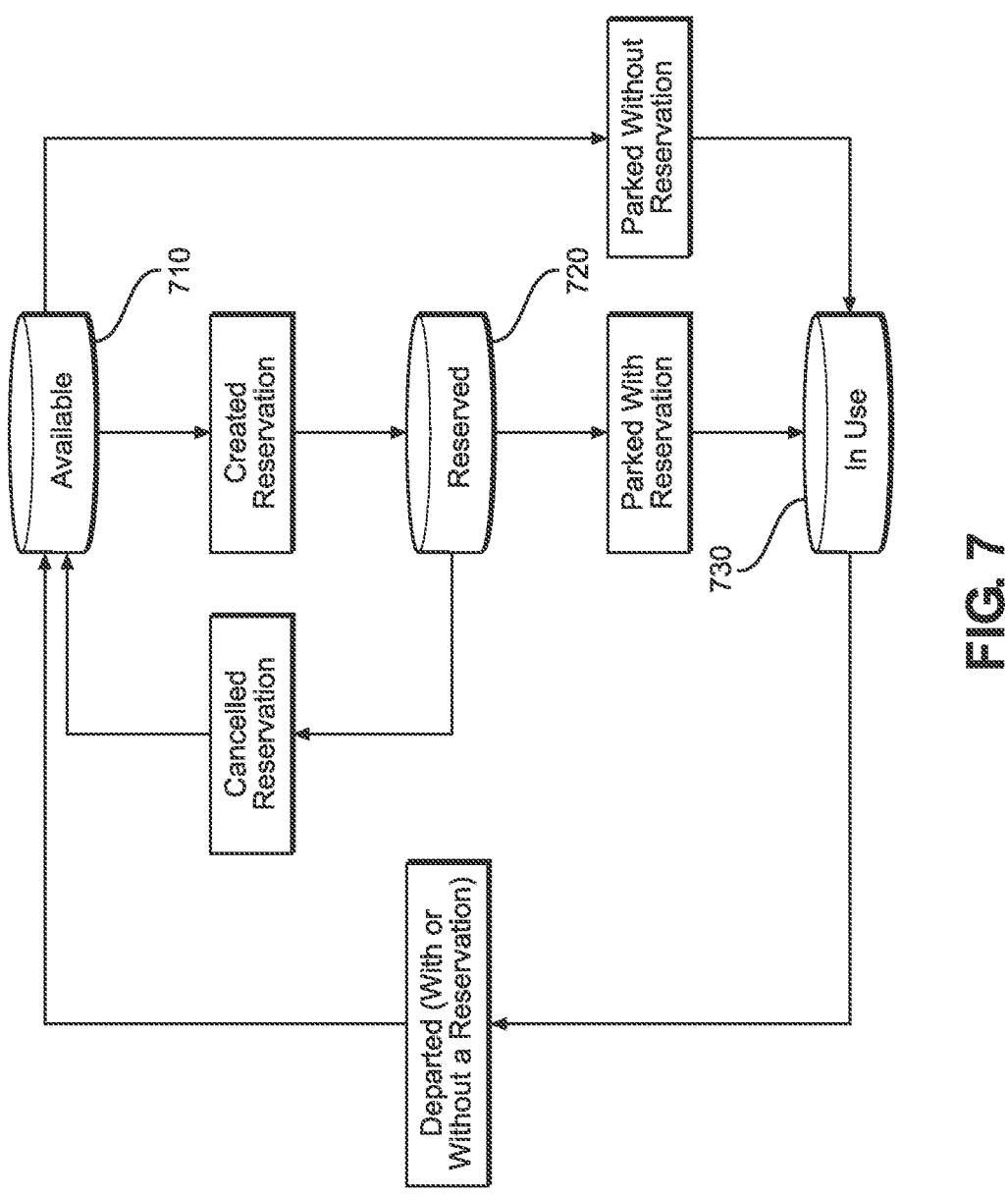
Figure 8:
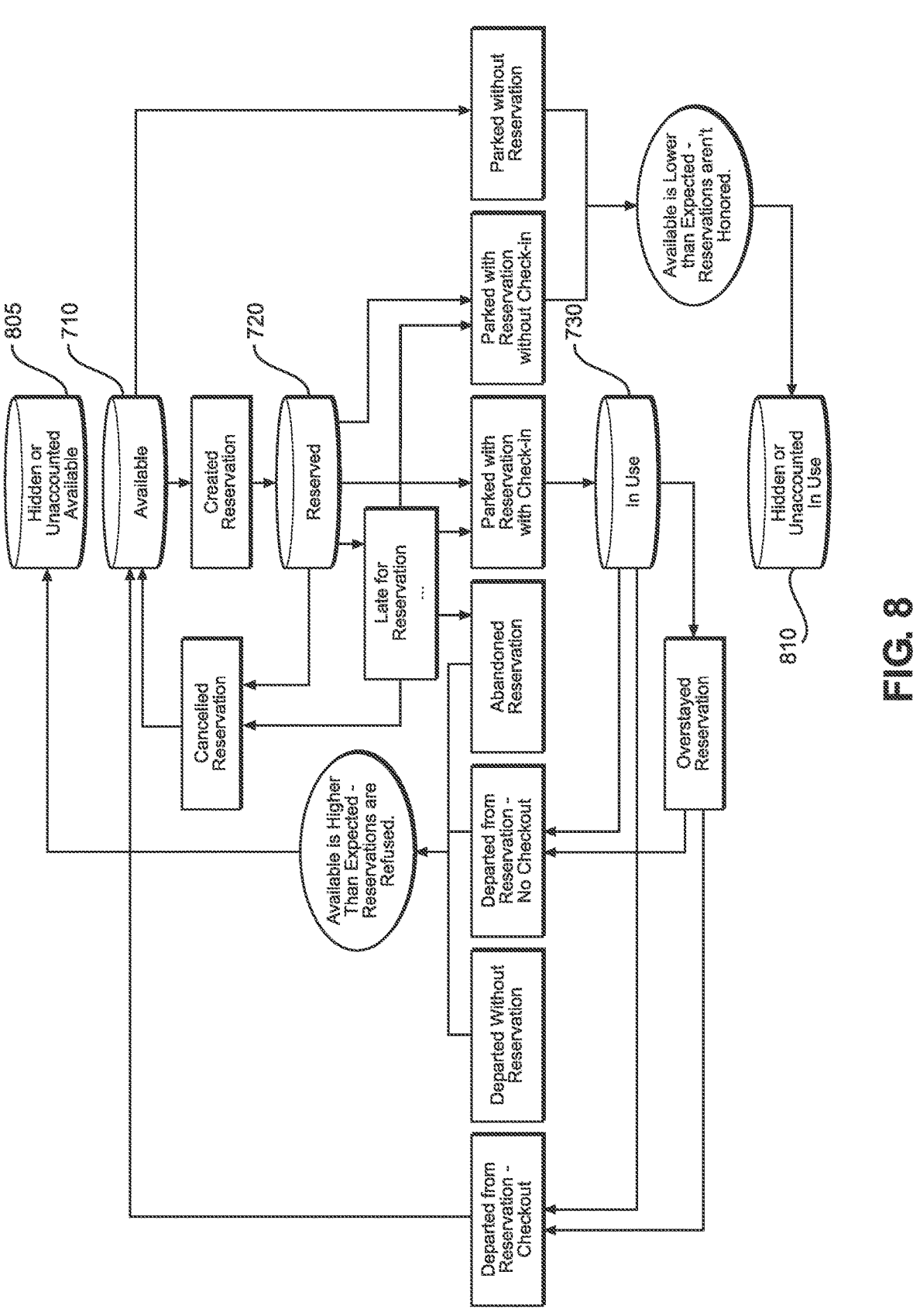

FIGS. 7-8 diagrammatically illustrate exemplary state models as used by the present disclosure.

Figure 9:
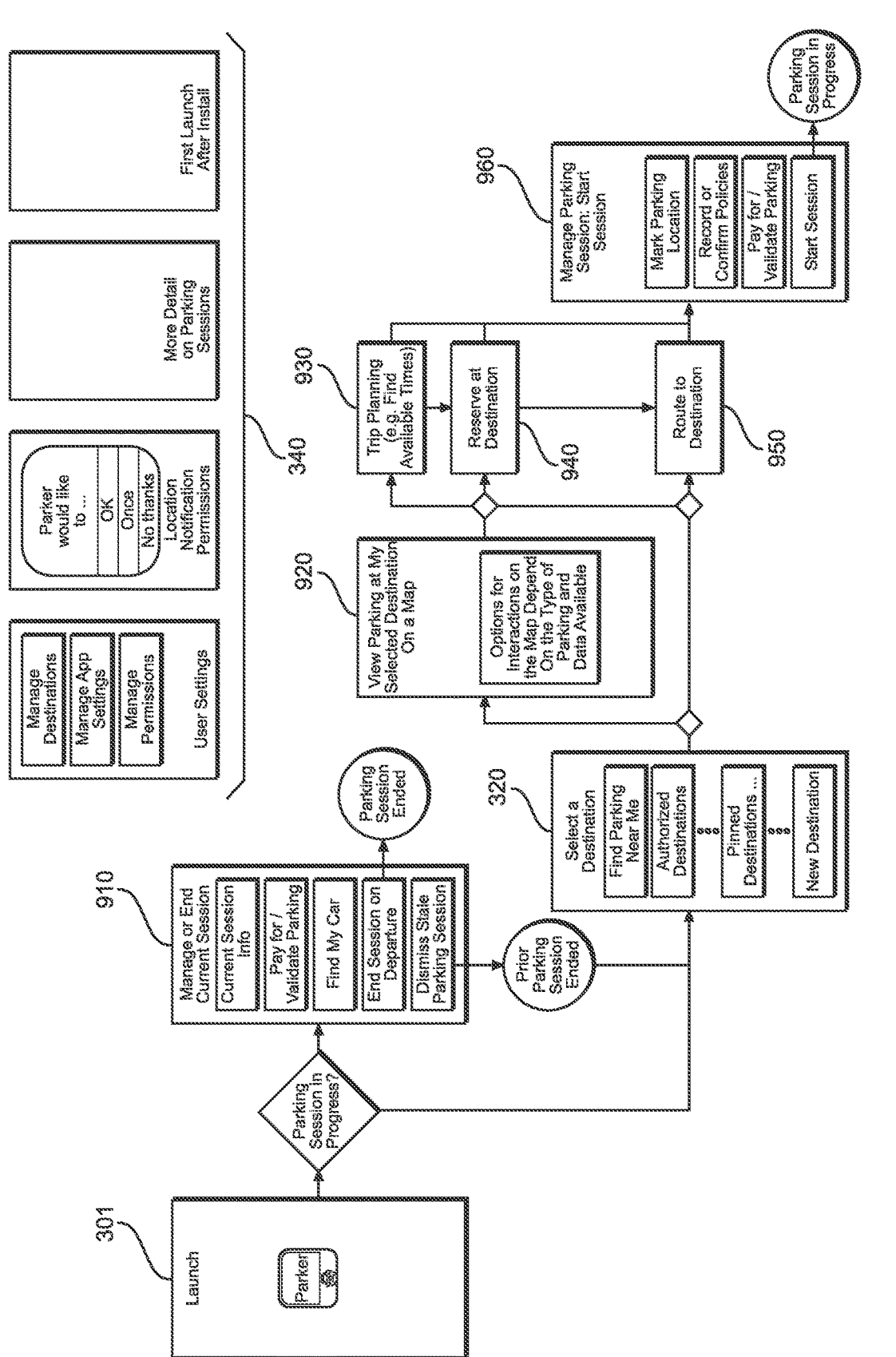

FIG. 9 diagrammatically illustrates an exemplary data flow for the present disclosure.

Figure 10:
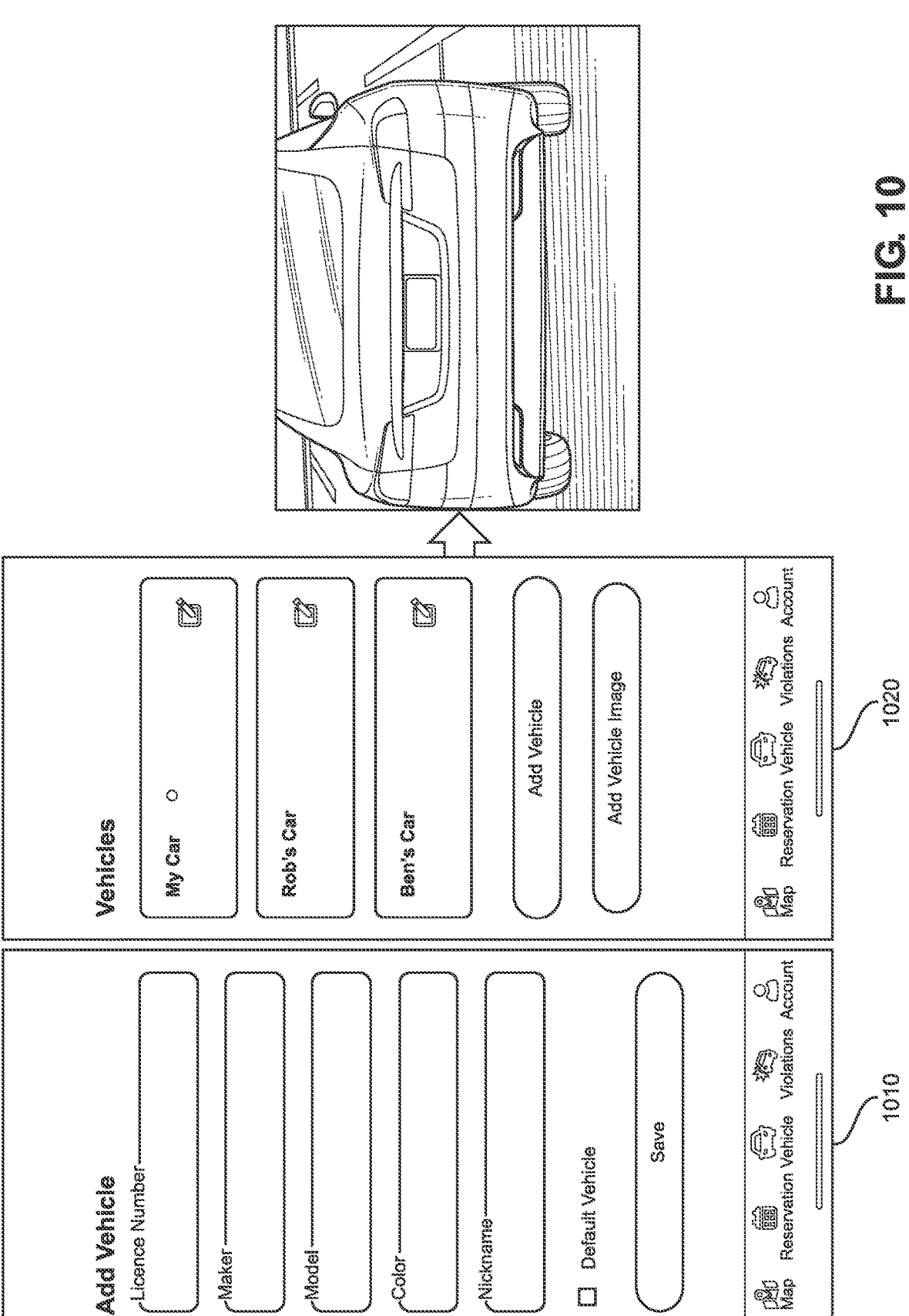
Figures 11A, 11B:
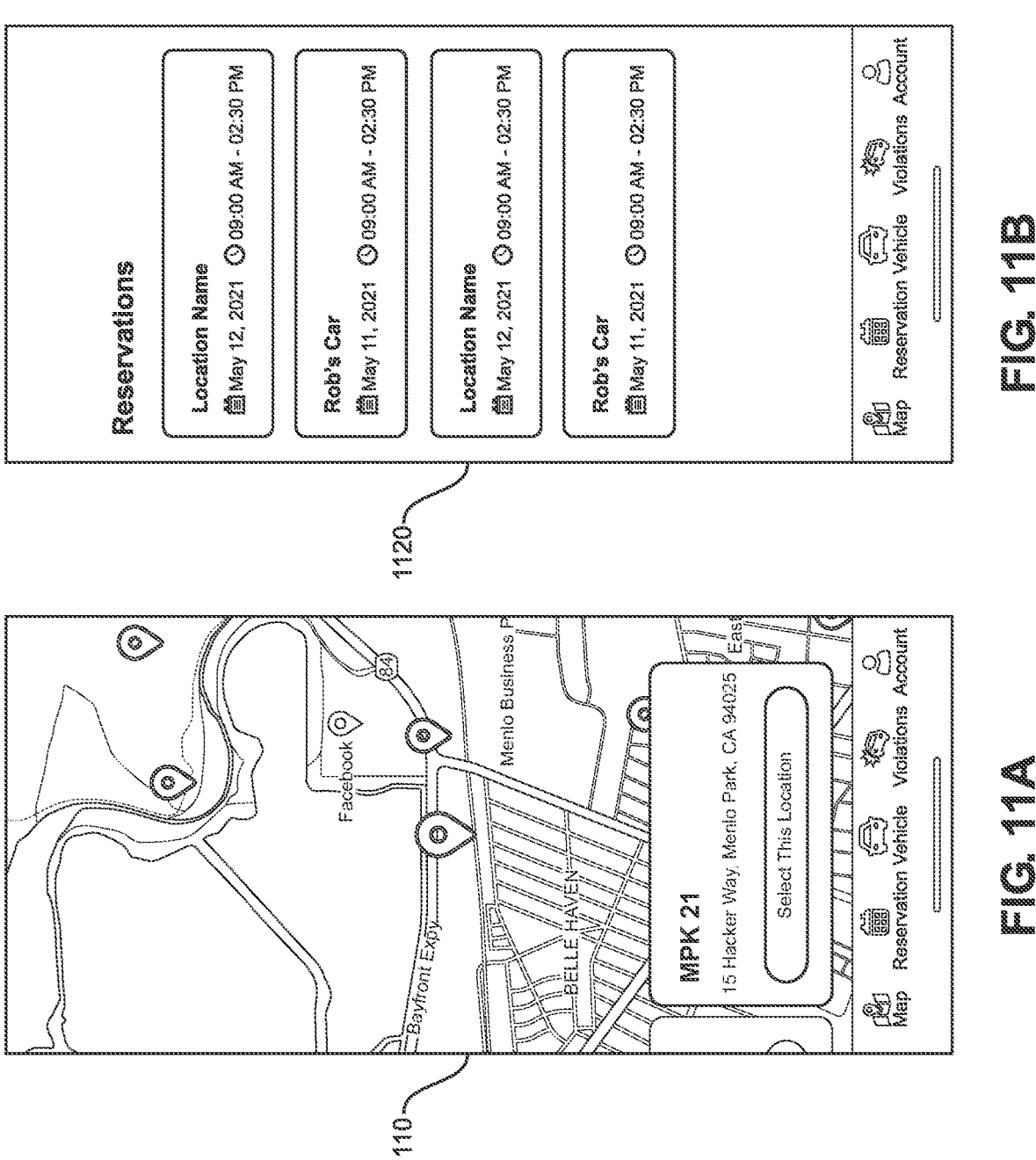
Figures 11C, 11D:
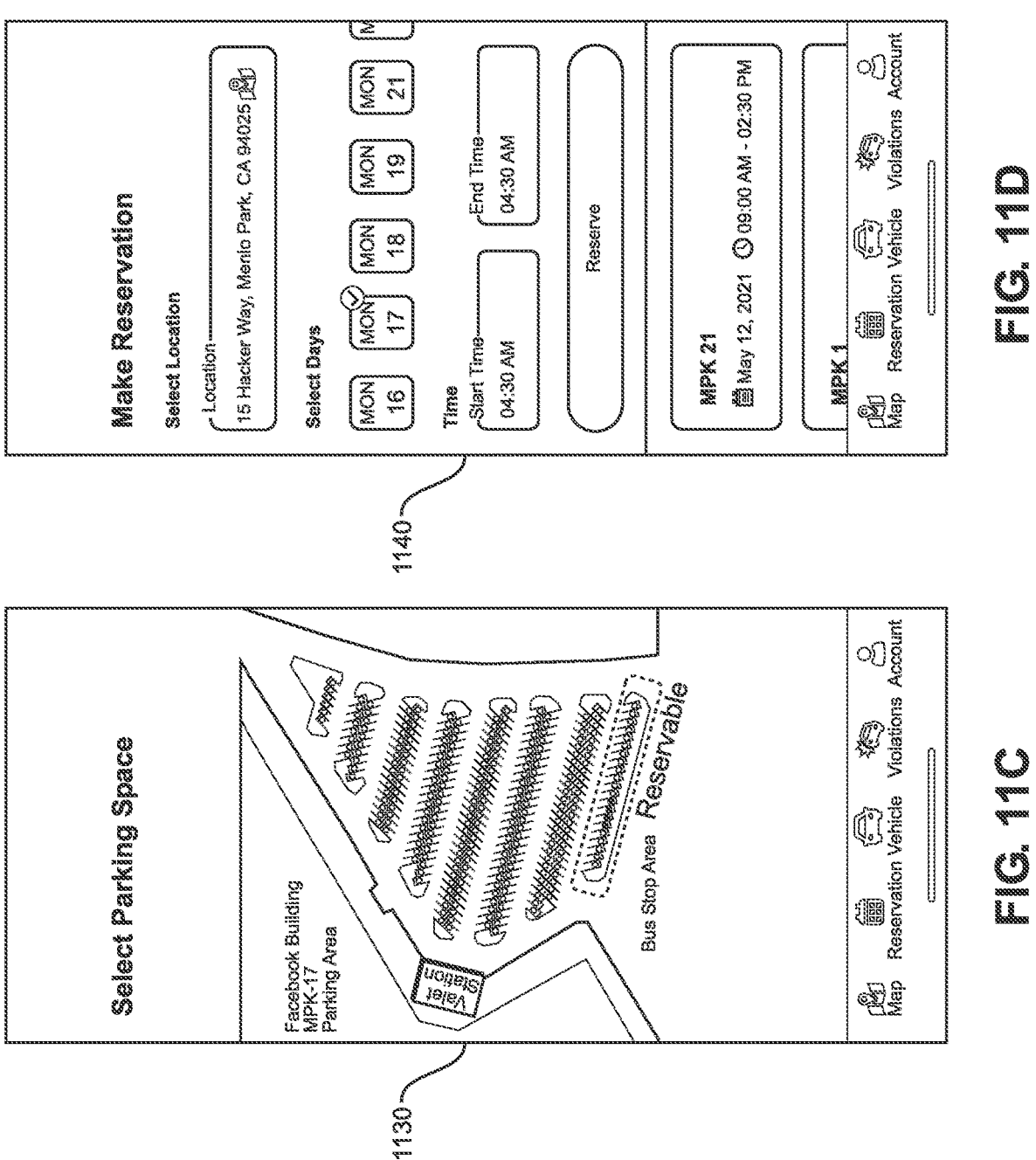
Figure 12:
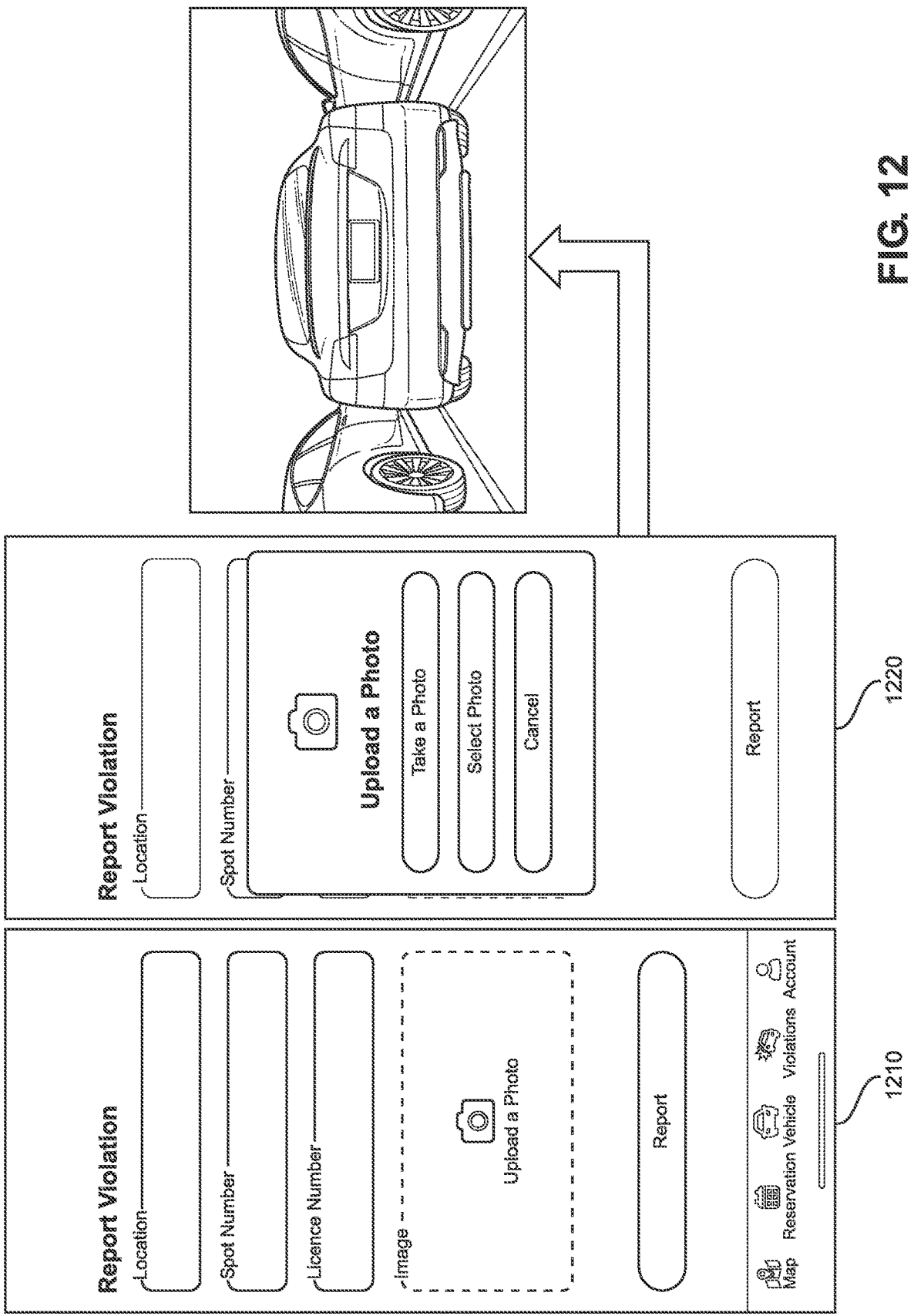

FIGS. 10-12 depict exemplary embodiments of user interfaces for implementing the present disclosure.

Figure 13:
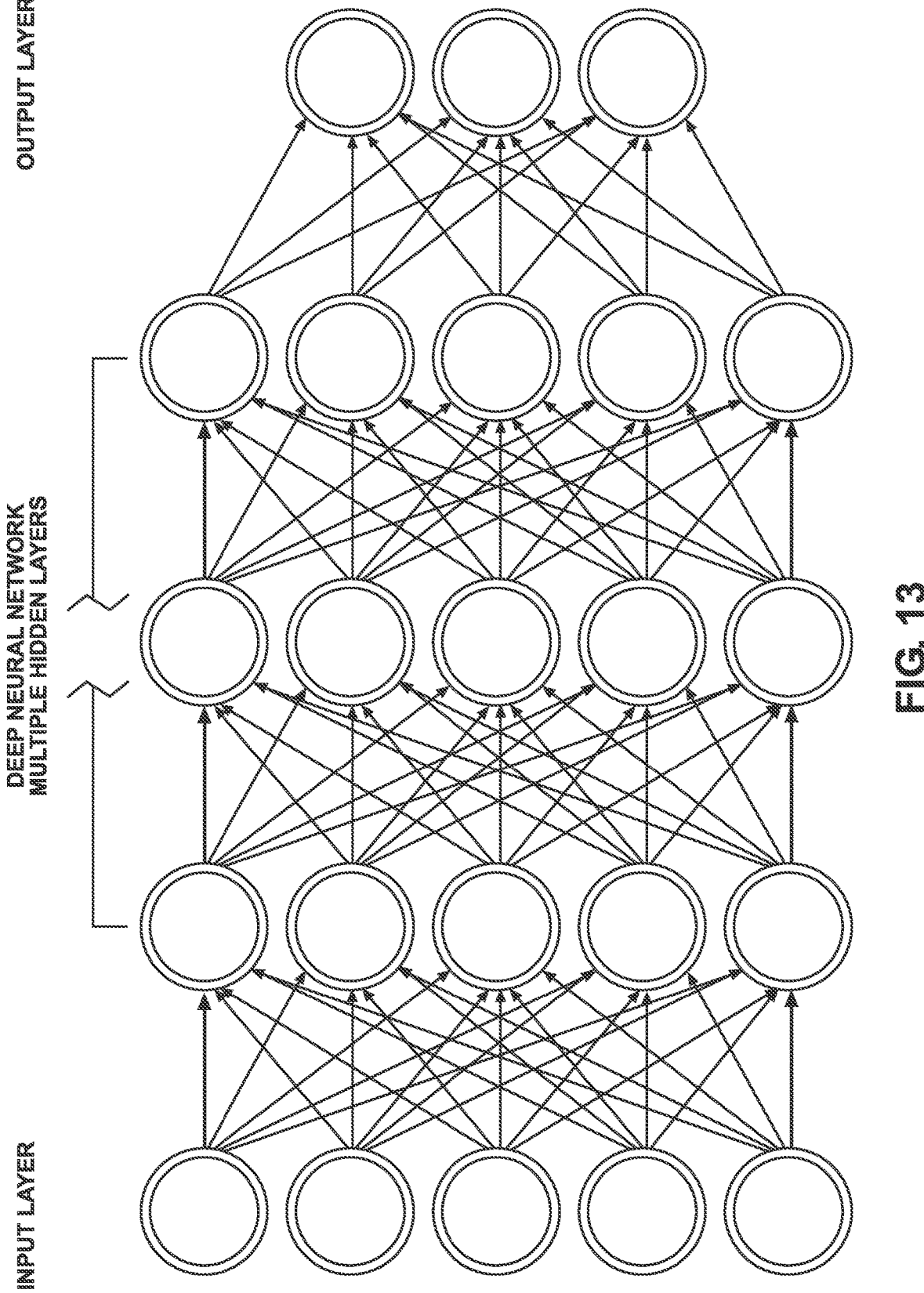

FIG. 13 depicts an exemplary deep neural network.

DETAILED DESCRIPTION

The elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of a particular task when executed by a processor. Computer-executable instructions and associated data structures stored in a computer-readable storage medium represent examples of programming means for executing the steps of the methods and/or implementing particular system configurations disclosed herein.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments.

Depending on the context of discussion herein, a singular term may include its plural forms and a plural term may include its singular form. Similarly, a hyphenated term may be occasionally interchangeably used with its non-hyphenated version, a capitalized entry may be interchangeably used with its non-capitalized version, and an italicized term may be interchangeably used with its non-italicized version. Such occasional interchangeable uses shall not be considered inconsistent with each other.

As used herein, "parking area", "parking lot," and "parking structure" are used interchangeably, and generally refer to areas or structures provided for parking vehicles.

Additionally, as used herein, "parking spot" and "parking stall", or simply "stall", are used interchangeably, and generally refer to locations designated for parking a vehicle.

While the proposed embodiments generally refer to parking motor vehicles, it is understood that the technology disclosed herein can be implemented in alternative contexts such as aviation or maritime applications.

Common issues for parking structure operators are identifying traffic patterns, parking availability, location of empty parking stalls, and guiding drivers to empty stalls.

At present, sensor systems in parking structures are commonly used for determining a number of available parking stalls and displaying this number on an entrance to a parking structure. However, such systems do not indicate where available parking stalls may be located, or how to find them from the entrance to the parking structure.

Furthermore, at present, cities and municipalities continue to implement parking policies using parking meters, which cost money and infrastructure and require service, collection, and maintenance. Pay-by-phone options are available in some places, but these do not always indicate which space is occupied or for how long it will be occupied.

Some available solutions include verbal or written descriptions from a parking structure's attendant may be logistically difficult and are generally not updated in real time.

It is thus desirable to develop a solution in which available parking stalls may be determined and real-time guidance may be provided to drivers looking to park in a parking structure.

According to embodiments of the present disclosure, a system can be implemented for pairing a user seeking a parking space with an available parking space. The system comprises at least one positional device located proximally to the user occupying a vehicle; at least one sensory input device positioned on an infrastructure point, the infrastructure point being located proximally to at least one parking space of one or more parking spaces; and a central server platform comprising at least one server having at least one processor and at least one memory unit communicatively coupled with the processor, the at least one memory unit storing instructions. The instructions, when executed by the processor, cause the central server platform to perform a method, the method comprising: receiving a first one or more signals from the at least one positional device, the first one or more signals indicating an intention of the user to seek parking and further indicating a location of the user; receiving a second one or more signals from the at least one sensory input device, the second one or more signals indicating an availability of the at least one parking space; determining, from the second one or more signals, which of the one or more parking spaces are available to the user; pairing the user with the at least one parking space; and transmitting a notification of the pairing to the positional device.

The present disclosure includes triangulation of a positional device with respect to one or more sensors, including distance or depth sensors and motion sensors.

In some embodiments of the present disclosure, a combination of sensory input devices, including optical sensors, cameras, or ultra-wideband (UWB) sensors, enable a network to detect, track, and push information to a positional device such as a smartphone, smartwatch, cell phone, or tablet, or to a vehicle's built-in computer or GPS unit. The positional device is generally located proximally to a user occupying a vehicle or is housed within or mounted upon the vehicle itself.

It should be noted that many embodiments use the user device, such as a smartphone, tablet, or GPS unit as the positional device. However, further embodiments are enabled for a positional device comprising a license plate, vehicle identification number tag, or a tag affixed to or housed within the vehicle, any of which are readable electronically or optically.

In preferred embodiments, the system detects the positional device when the device arrives, stays, and departs, and determines what the user will have to pay, how much time the user is allotted, and whether the user is allowed to renew a reservation or must move the vehicle.

In some embodiments, the present disclosure uses UWB sensors placed throughout a parking lot or structure. In further embodiments, the sensors are optical sensors such as visual detectors or passive infrared detectors. In further embodiments, the sensors are at least one of: electromagnetic, microwave, radio wave, radio-frequency identification, tomographic, Bluetooth® technology, or ultrasonic detectors.

The sensors are mounted on infrastructure points, which include walls, curbs, bollards, signposts, or other structural points proximal to a parking space. The sensors are used to track a particular driver's location within the parking structure, including by telemetry using smartphones, tablets, or a vehicle's built-in computer.

It should be noted that some embodiments use more than one sensory input device for determining vacancy of a parking stall or area. It should further be noted that some embodiments use more than one sensor within a network of sensors to triangulate the position of a positional device relative to the parking stall, parking area, or sensory devices themselves.

In some embodiments, an application or program for using the methods disclosed herein is downloadable to the positional device or to any user device. The application is configured to receive a user request for a parking stall, and further to receive notifications, including a notification that the user has been paired with a parking stall. In some embodiments, the application includes a map featuring the location of the parking stall and the route from the user's current location to the location of the parking stall. In some embodiments, the user request, notifications, and map are sent and received through a web browser.

In some embodiments, results of the sensors' tracking are displayed on the user's device and show a target location, such as an empty parking stall, along with the driver's current location and a route or proposed route from the current location to the target location.

Further embodiments include guided routes or proposed guided routes to reserved parking stalls.

In some embodiments, parking stalls detectable within the network are reservable, enabling operators to plan and prepare for traffic congestion events, route traffic more efficiently, and make contingency plans for overflow.

In some embodiments, the downloadable application includes a reservation feature by which a user to reserve a parking space in advance. In some embodiments, the application includes a payment feature, where payment for occupying the parking space is initiated upon meeting a condition for payment. In some embodiments, conditions triggering payment include user approval of payment as indicated through the application; automatic payment submitted upon parking the vehicle in the space; and automatic payment after a pre-determined time interval in which the vehicle is parked in the at least one parking space.

In some embodiments, the user's payment information is saved to the application for use with future requests for payment. In such embodiments, the application passively charges the driver upon the system detecting a parking event.

In addition to reservation and payment for an allotted time, municipalities are enabled to use the systems and methods, including the payment feature, to enforce parking codes and collect fines.

Further embodiments include notifications, such as push notifications, that closer or more advantageous parking stalls have become available, including stalls closer to the user's current location, or closer to an entrance or exit to the parking structure. Further embodiments include indications that a stall is empty but reserved.

For detection of availability of a target location such as a parking stall, preferred embodiments rely upon sensors such as UWB sensors that are embedded on infrastructure points near stalls, the sensors configured to relay information to a central server platform, the information concerning whether the nearby stall is occupied or unoccupied.

The central server platform may be a single server or a network of servers and may be totally centralized or distributed.

Some embodiments of the overall system include parking structure design specifications or modifications to allow for increased receptivity of signals relayed from the sensory input devices. Such specifications or modifications include structural materials that facilitate signal transmission or interconnected networks of buses and transmission lines.

Some embodiments include a predefined map of the parking area, including ingresses and egresses, lanes, avenues of travel, and issues preventing travel, such as one-way lanes, areas blocked for construction, areas set aside for pedestrian use, and other such details.

In some embodiments, some parking stalls are configurable to be flagged as reserved for handicapped drivers, electric vehicles, very important persons (VIPs), and other specialized parking not available to the general public.

The network of sensory input devices and central server platform is configured to receive queries from user devices via a web interface or a preloaded application. When the query is received, the sensory input devices are used to triangulate the user's location. Information regarding the user's current location is then relayed to the central server platform, which pairs the user with an available parking stall.

In some embodiments, the web-based or preloaded application would identify one or more parking stalls as "open". A user then selects an open stall. The application provides the user's location and selected stall. In further embodiments, the user is paired with a stall at random, or based on a set of rules or preferences, which are configurable by the user. For example, in some embodiments, the user selects an option to park near an entrance to a venue, to a nearest available space, to a space in a less densely crowded area, or to a space with a longer or shorter time limit than spaces in the surrounding area. Some embodiments further provide a map or list of directions to the selected stall.

In the event that a closer parking stall should become available, some embodiments offer a selection for the user to continue to the pre-determined stall or to select the newly available stall and adjust their course accordingly.

Further embodiments include proposed routes from great distances from the parking area. Such embodiments enable users to check for available stalls in parking lots several miles from their present location and be guided accordingly.

Further embodiments include advanced reservations of parking stalls. Users are notified that stalls have been reserved and are not available for use, although such stalls may be empty at present. Some embodiments further include a notification system to inform parking attendants that a driver has taken a reserved stall, or a stall the driver is not authorized to take.

Additionally, further embodiments include data tracking. Data collected by the sensory input devices, as well as data regarding parking events, traffic ebbs and flows, anomalies such as vehicles waiting or passing by empty stalls, reservation requests, and application usage are tracked and used for predictive modeling. In some embodiments, predictive modeling of traffic and parking patterns is implemented by way of a deep neural network. The deep neural network is trained using data collected from positional devices and sensory input devices in parking areas. An input is then fed to the neural network, such as a present arrangement of sensors; a present traffic or parking pattern, density, or expectation given an upcoming event. An output is received from the deep neural network and, in some embodiments, includes anomaly detection, whereby calculated capacity is determined to be higher or lower than actual capacity, indicating a need for increased monitoring.

Using the systems and methods disclosed herein, tracked data points such as these assist in refining installation of additional sensory input devices as needed, as well as signage and other measures to increase efficiency of traffic within a parking structure.

FIG. 1 diagrammatically illustrates an exemplary embodiment of the system described herein. The system comprises at least one positional device 110 located proximally to a user occupying a vehicle; at least one sensory input device 120 positioned on an infrastructure point, the infrastructure point being located proximally to at least one parking space 130; and a central server platform 140 that performs a method. The method comprises: receiving a first one or more signals 150 from the positional device 110, the first one or more signals 150 indicating an intention of a user to seek parking and further indicating the location of the positional device 110; receiving a second one or more signals 160 from the at least one sensory input device 120, the second one or more signals 160 indicating an availability of the at least one parking space 130; determining, from the second one or more signals 160, which of the at least one parking space 130 is available to the user; pairing the user with the at least one parking space 130; and transmitting a notification of the pairing to the positional device 110.

FIG. 2 diagrammatically illustrates an exemplary embodiment of the method disclosed herein. When implemented, the method includes the steps of: receiving a first one or more signals from at least one positional device, the first one or more signals indicating intention of the user to seek parking 210; receiving a second one or more signals from at least one sensory input device positioned on an infrastructure point located proximally to at least one parking space, the second one or more signals indicating an availability of the at least one parking space 220; determining, based on the information, the availability of at least one parking stall 230; pairing the user with an available parking space 240; and transmitting a notification of the pairing to the positional device 250.

Figure 3:
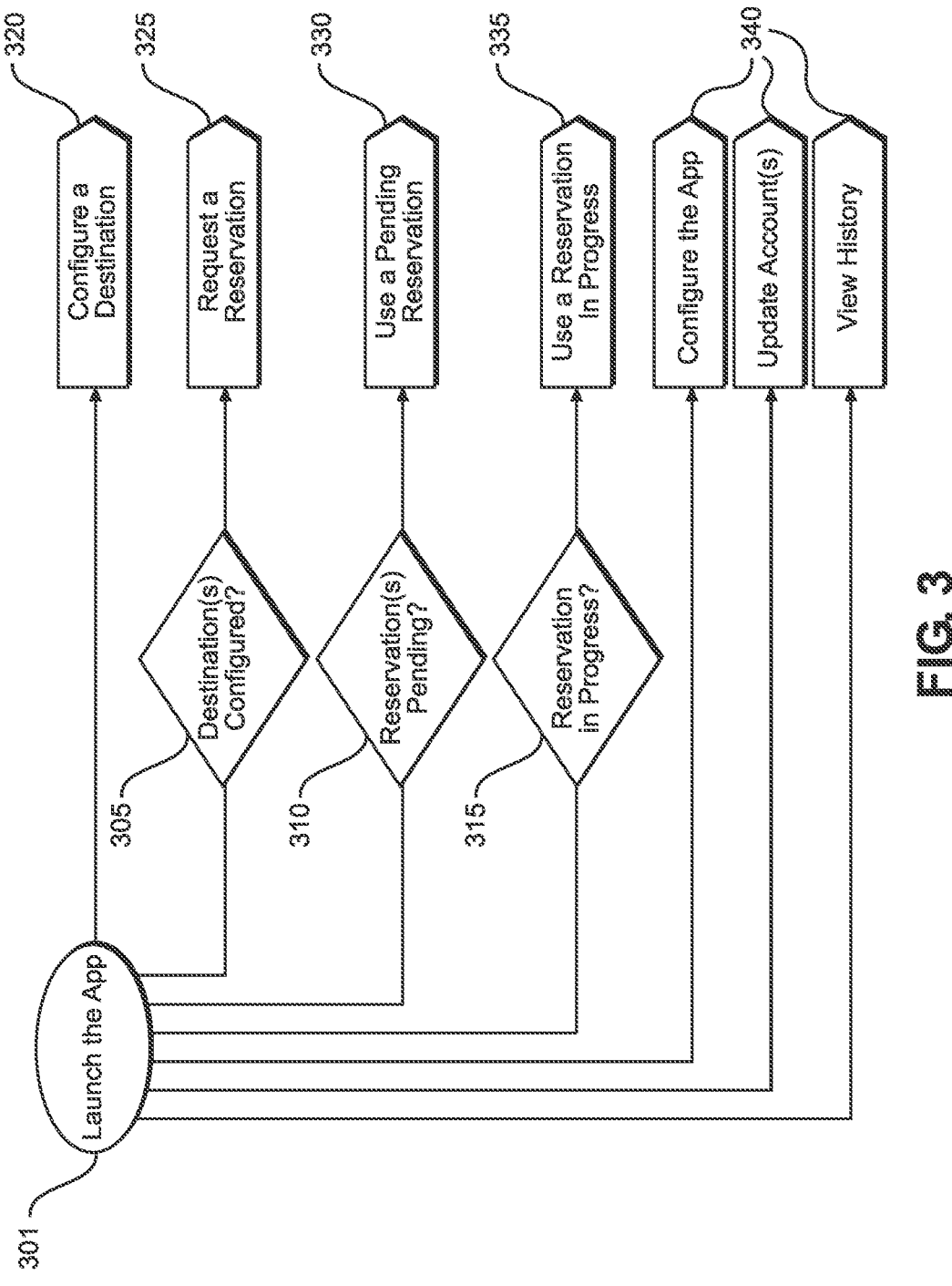

FIG. 3 diagrammatically illustrates an exemplary method for using the downloadable application to seek and reserve a parking stall. The user launches the app 301 and selects from a menu of options. Initial options include configure a destination 320 or other ancillary options 340, such as configure the application, update account(s), or view history. If a destination is configured 305, the user is presented with the option to request a reservation 325 for a parking stall at the destination. If one or more reservations are pending 310, the user is presented with the option to use a pending reservation 330. If a reservation is in progress 315, the user is presented with the option to use the reservation in progress 335. The processes for configuring a destination 320, requesting a reservation 325, using a pending reservation 330, and using a reservation in progress 335 are described in more detail below.

Figure 4:
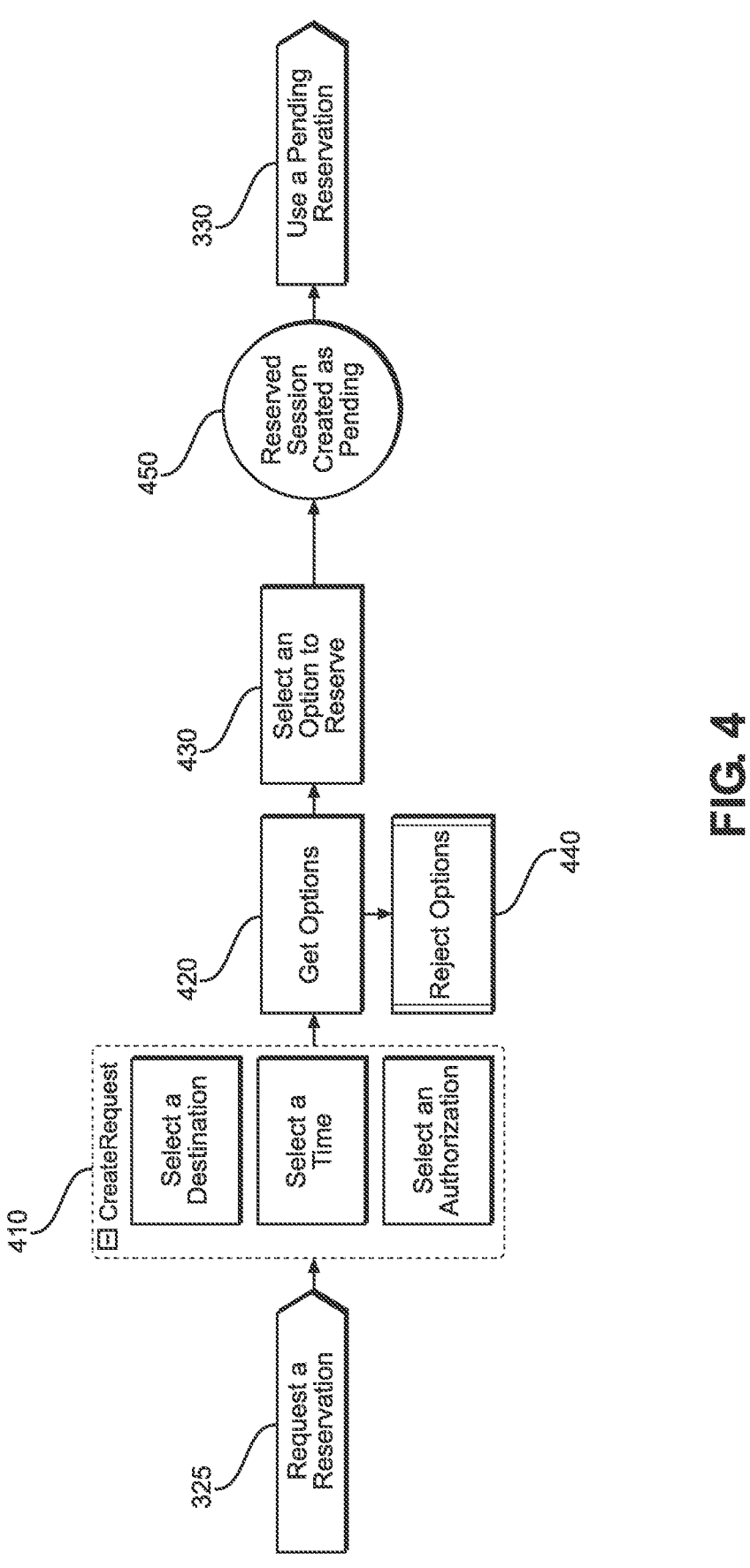

FIG. 4 diagrammatically illustrates an exemplary method for requesting a reservation as implemented by the present disclosure. To request a reservation 325, the user creates a request 410, which includes a selection of a destination, a selection of a time slot, and a selection of an authorization. The central server platform 140 sends a list of options to the user ("get options 420"). The user selects an option to reserve 430 or rejects options 440 where the options are not suitable or preferred by the user. Once the user has selected an option to reserve 430, a reserved session is created as pending 450. Subsequently, the user may use the pending reservation 330.

Figure 5:
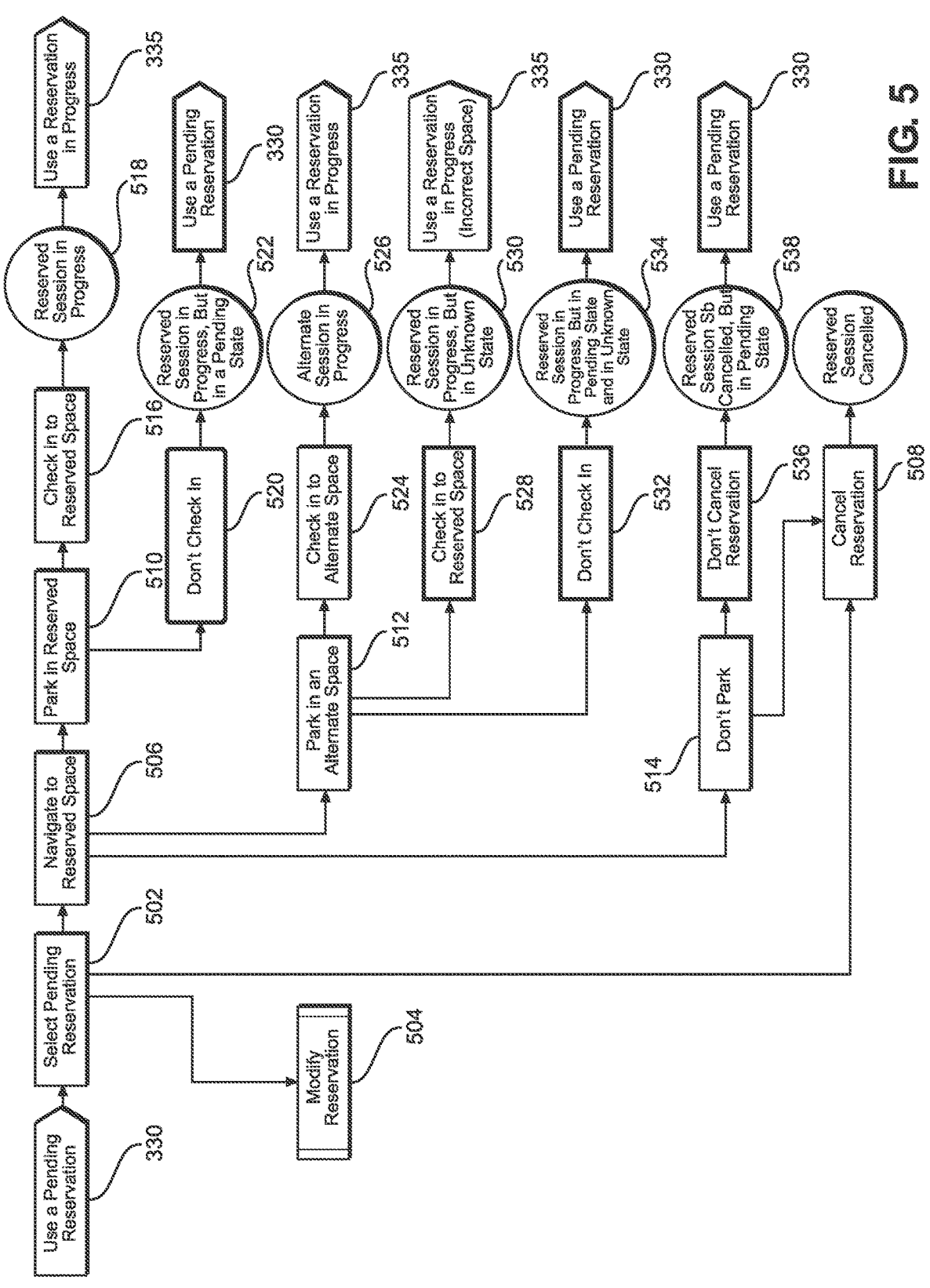

FIG. 5 diagrammatically illustrates an exemplary method for using a pending reservation 330. Using the application, the user selects the pending reservation 502 and either modifies the reservation 504, navigates to the reserved space 506, or cancels the reservation 508. If the user has navigated to the reserved space 506, the user may park in the reserved space 510, park in an alternative space 512, or decide not to park 514.

If the user parks in the reserved space 510, the central server determines that, based on positional data received from the positional device 110, as well as from data received from the sensory input devices at least one sensory input device 120 and checks the user into the reserved space 516. The reserved session is then in progress 518.

It should be noted that a user may opt not to check into a reserved session upon parking. Upon selection a "Don't Check In" option 520, the reserved session is still considered in progress, but is denoted as in a pending state 522. The user is then using a pending reservation 330.

As noted previously, a user may park in an alternate space 512, such as a closer, more convenient, or newly available space. In such case, the server may use the positional data and sensor data to check the user into a session in the alternate space 524. An alternate session is then in progress 526. In some embodiments, the alternate session is used to modify the original reservation, in which case the original reservation is determined to be in progress.

In some cases, the user may mistakenly or intentionally park in an alternate space 512 but check into the reserved space 528. In such cases, the reservation is determined to be in progress, but the space is unknown 530. In some such embodiments, the user is then using a reservation in progress 335, albeit with the incorrect space. Alternatively, the user may park in an alternate space 512 and not check in at all 532, in which case the reserved session is in progress, but in a pending state and in an unknown space 534. The user is then using a pending reservation 330.

It is further noted that in some embodiments, if the user does not park 514, but does not cancel the reservation 536, the reserved session is in a pending state 538 and the user is using a pending reservation 330.

Figure 6:
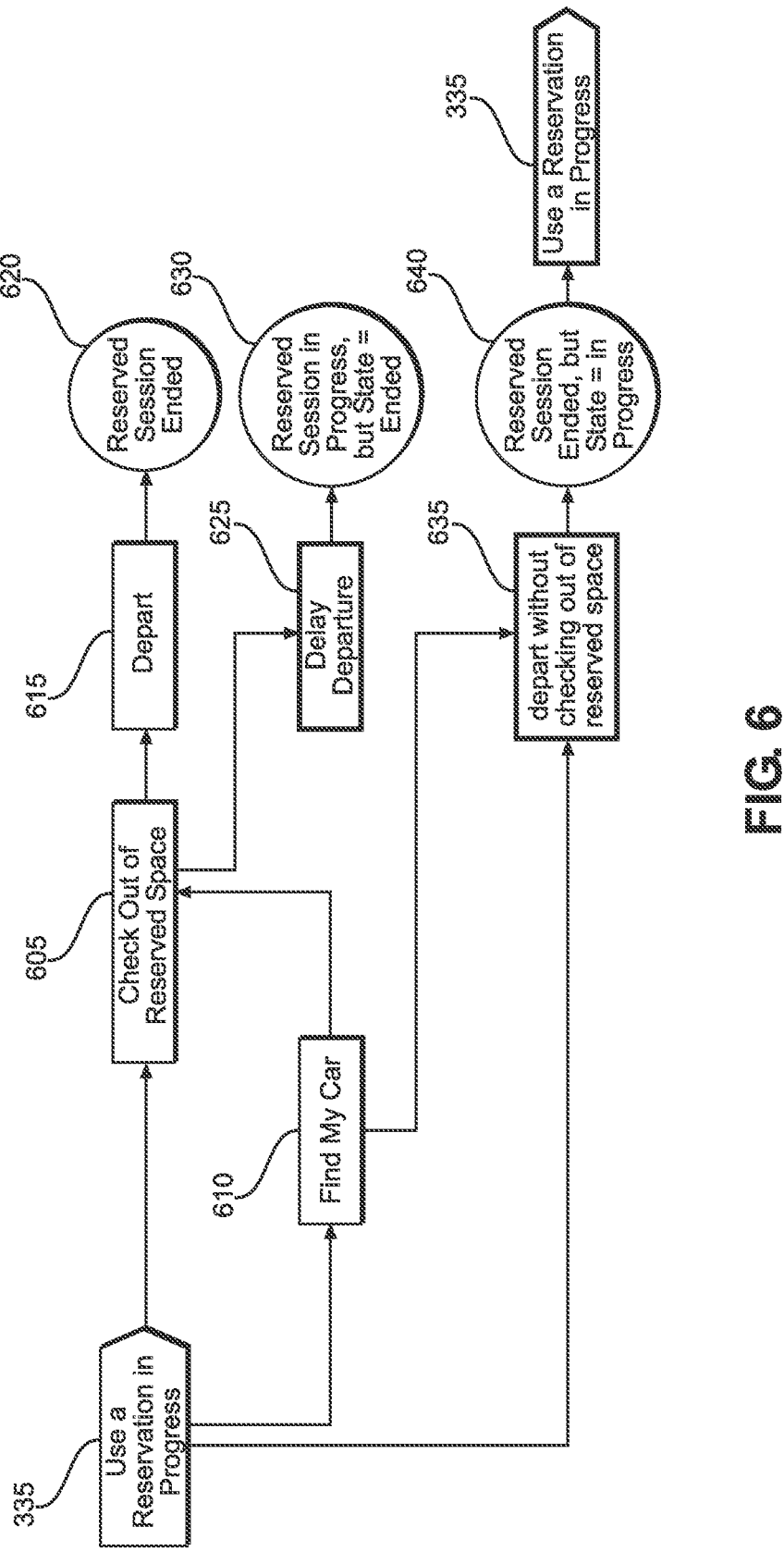

FIG. 6 diagrammatically illustrates an exemplary method for use of a reservation in progress 335. By the application, the user is presented with the option to check out of the reserved space 605. Some embodiments include a "Find My Car" feature 610 whereby the system saves and stores the parking location in memory and uses telemetry based on the positional device location, or other user device, to direct the user to the location of the parked car. Upon checking out of the reserved space 605, the user departs 615 and the reserved session is ended 620. Alternatively, in some embodiments, the user opts to delay departure 625, in which case the session remains in progress, although the reservation has ended 630. In some cases, the user departs without checking out of the reserved space 635, in which case the reserved session is ended but the state is still read as in progress 640. In each case, the central server platform determines from the sensory input devices that the stall is vacant, and further that the session is concluded based on messages from the positional device or from conditions such as time slot expiration.

FIG. 7 diagrammatically illustrates a state model for the states in which a parking space may exist within the system. A parking space may be available 710, reserved 720, or in use 730. An available 710 parking space becomes in use 730 when a driver parks in the parking space without a reservation. The space becomes available 710 from in use 730 whenever a driver departs, whether or not the driver had a reservation. An available 710 space becomes reserved 720 when a reservation is created. The reserved 720 space becomes available when the reservation is cancelled or becomes in use 730 when a driver with a reservation occupies the space. The totality of available 710, reserved 720, and in use 730 parking spaces add up to the total actual parking capacity in the system.

It should be noted that FIG. 7 depicts a "naïve" state model, in which every component functions as expected, and every participant behaves as expected. It should further be noted that a parking space can move from one state to another but cannot be in more than one state at a time.

FIG. 8 diagrammatically illustrates another state model for the states in which a parking space may exist within the system. The state model of FIG. 8 includes additional transitions that some embodiments do not recognize, as well as the resulting states. In addition to the available 710, reserved 720, and in use 730 states, a space may be hidden or unaccounted for, available 805 or hidden or unaccounted for, in use 810. A parking space is caused to be hidden or unaccounted for, available 805 when, for example, a driver departs without a reservation, departs a reservation without checking out, or when a driver abandons the reservation. In such cases, availability is higher than expected, and reservations are refused. A parking space becomes hidden or unaccounted for, in use 810 when, for example, a driver parks in the space without a reservation, or without checking into a reservation. In such cases, availability is lower than expected, and reservations are not honored.

To address these issues, exemplary embodiments implement controls for managing or monitoring use of parking spaces in a parking area. Such controls include, for example, monitoring using any of the sensory input devices, including UWB sensors or cameras; access monitoring at entry and exit point, including identifying a positional device in proximity to the parking area and associating the positional device to a reservation; and active enforcement, including issuance of fines by a municipality for violations in public parking areas.

As noted above, exemplary systems for detecting anomalies in parking patterns include deep neural networks trained on data from parking and traffic patterns. Such systems determine anomalies by comparing present inputs with historical data and are configured to output recommendations regarding methods for increased monitoring, such as entry or exit monitoring, increased concentration of sensory input devices, or more active monitoring by personnel.

FIG. 9 diagrammatically illustrates an exemplary data flow for the present disclosure. The exemplary data flow includes managing or ending a current session 910, which includes current session information, an option to pay for or validate parking, a "Find My Car" feature 610, an option to end the session upon departure, and an option to dismiss a stale parking session. The session start and end are automated as much as possible, allowing for automatic termination and automatic initiation, with the exceptions of payment when required or scheduling a reservation.

Further depicted in FIG. 9 are menus presented on the user interface, including configuring the destination 320, which may include options to locate nearby parking, authorized destinations, pinned or pre-saved destinations, or a new destination. A view parking at selected destination screen 920 is also shown and includes options for interactions on the map. Some embodiments include trip planning 930, such as finding available times; an option to reserve the space at the destination 940, and a route to destination 950. Also shown is a screen for managing the parking session 960, here including marking the parking location on the map, so that the user is subsequently able to use the "Find My Car" feature 610, and further including the option to record or confirm parking policies; pay for or validate parking; or start the reservation. Ancillary options 340 are shown, including user settings, location and notification permissions, and more detail on parking sessions.

FIG. 10 depicts an exemplary embodiment of a user interface for implementing the present disclosure. By way of the application, a user enters vehicle information 1010 for one or more vehicles that are trackable using the positional device. A list of saved vehicles 1020 is included in the application. The user may open the application and indicate which vehicle is in use by selecting the vehicle from the list of saved vehicles 1020.

FIG. 11 depicts another exemplary embodiment of a user interface for implementing the present disclosure. Shown in FIG. 11 are an exemplary map of parking locations 1110, a list of reservations 1120, a map of a parking area 1130 with a feature for hand-selection of an available parking space, and a "Make a Reservation" page 1140 for selecting the date, time, and location of the reservation.

FIG. 12 depicts another exemplary embodiment of a user interface for implementing the present disclosure, here used by municipalities for parking code enforcement. A violation report 1210 is generated using the application. Some embodiments include an option for photograph upload 1220. It should be noted that further embodiments are configured for enforcement of parking code violations automatically upon occurrence of a condition, such as a vehicle parking in a "No Parking" zone, a vehicle parking for longer than an allotted time slot, or a vehicle determined by the system to be otherwise noncompliant with the municipal parking code.

FIG. 13 shows an exemplary deep neural network.

Neural networks, also known as artificial neural networks (ANNs) or simulated neural networks (SNNs), are a subset of machine learning and are at the heart of deep learning algorithms. Their name and structure are inspired by the human brain, mimicking the way that biological neurons signal to one another. Artificial neural networks (ANNs) are comprised of node layers, comprising an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network.

Neural networks rely on training data to learn and improve their accuracy over time. However, once these learning algorithms are fine-tuned for accuracy, they are powerful tools in computer science and artificial intelligence, allowing one to classify and cluster data at a high velocity. Tasks in speech recognition or image recognition can take minutes versus hours when compared to the manual identification by human experts. One of the most well-known neural networks is Google™'s search algorithm.

In some exemplary embodiments, one should view each individual node as its own linear regression model, composed of input data, weights, a bias (or threshold), and an output. Once an input layer is determined, weights are assigned. These weights help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming the input of the next node. This process of passing data from one layer to the next layer defines this neural network as a feedforward network. Larger weights signify that particular variables are of greater importance to the decision or outcome.

According to some exemplary embodiments, deep neural networks are feedforward, meaning they flow in one direction only, from input to output. However, one can also train a model through backpropagation; that is, move in the opposite direction from output to input. Backpropagation allows one to calculate and attribute the error associated with each neuron, allowing one to adjust and fit the parameters of the model(s) appropriately.

In machine learning, backpropagation is an algorithm for training feedforward neural networks. Generalizations of backpropagation exist for other artificial neural networks (ANNs), and for functions generally. These classes of algorithms are all referred to generically as "backpropagation".

In fitting a neural network, backpropagation computes the gradient of the loss function with respect to the weights of the network for a single input-output example, and does so efficiently, unlike a naive direct computation of the gradient with respect to each weight individually. This efficiency makes it feasible to use gradient methods for training multilayer networks, updating weights to minimize loss; gradient descent, or variants such as stochastic gradient descent, are used. The backpropagation algorithm works by computing the gradient of the loss function with respect to each weight by the chain rule, computing the gradient one layer at a time, iterating backward from the last layer to avoid redundant calculations of intermediate terms in the chain rule; this is an example of dynamic programming. The term backpropagation strictly refers only to the algorithm for computing the gradient, not how the gradient is used; however, the term is often used loosely to refer to the entire learning algorithm, including how the gradient is used, such as by stochastic gradient descent. Backpropagation generalizes the gradient computation in the delta rule, which is the single-layer version of backpropagation, and is in turn generalized by automatic differentiation, where backpropagation is a special case of reverse accumulation (or "reverse mode").

With respect to FIG. 13, according to some exemplary embodiments, the system produces an output, which in turn produces an outcome, which in turn produces an input. In some embodiments, the output may become the input.

While the present invention has been described with reference to exemplary embodiments, it will be understood by those skilled in the art that various changes may be made and equivalents may be substituted for elements thereof without departing from the true spirit and scope of the present invention. Various alternative systems may be utilized to implement the various methodologies described herein and various methods may be used to achieve certain results from the aforementioned systems.

What is claimed is:

1. A system for pairing a user seeking a parking space to an available parking space, the system comprising:

at least one positional device located proximally to a user occupying a vehicle wherein the positional device is configured to be triangulated with respect to one or more sensors within a network of sensors;

at least one sensory input device positioned on an infrastructure point, the infrastructure point being located proximally to at least one parking space of one or more parking spaces wherein the at least one sensory input device comprises an ultra-wideband sensor mounted on the infrastructure point and configured to detect occupancy of the at least one parking space, the ultra-wideband sensor configured to relay information to a central server platform, the information concerning whether the at least one parking space is occupied or unoccupied; and the central server platform comprising at least one server having at least one processor and at least one memory unit communicatively coupled with the processor, the at least one memory unit storing instructions which, when executed by the at least one processor, perform a method, the method comprising:

receiving a first one or more signals from the at least one positional device, the first one or more signals indicating an intention of a user to seek parking and further indicating a location of the positional device wherein the location is determined through triangulation of the positional device with respect to mounted on infrastructure points to triangulate the positional device's location relative to the parking spaces or the sensory devices themselves;

receiving a second one or more signals from the at least one sensory input device, the second one or more signals indicating an availability of the at least one parking space wherein the ultra-wideband sensor distinguishes between occupied and unoccupied states of the at least one parking space by relaying information concerning whether the nearby parking space is occupied or unoccupied to the central server platform;

determining, from the second one or more signals, which of the one or more parking spaces are available to the user wherein the determining is performed using predictive modeling of traffic and parking patterns implemented by a deep neural network that comprises an input layer for receiving sensor data, one or more hidden layers with weighted connections wherein each node connects to another and has an associated weight and threshold trained using stochastic learning with backpropagation that uses a gradient of a mathematical loss function to adjust weights of the neural network, and an output layer providing parking availability predictions, the neural network trained using data collected from positional devices and sensory input devices in parking areas to minimize false positives by performing an iterative training algorithm in which the neural network is retrained with an updated training set comprising false positives produced after initial training;

pairing the user with the at least one parking space based on the predictive modeling; and transmitting a notification of the pairing to the positional device wherein the notification includes a route or a proposed route from a current location of the positional device to the at least one parking space displayed on the positional device along with the user's current location.

2. The system of claim 1, further comprising an application downloadable to the positional device, the application configured to receive the notification of the pairing.

3. The system of claim 2, the application further comprising a map feature for directing the vehicle from a present position to the at least one parking space.

4. The system of claim 2, the application further comprising a payment feature where payment for occupying the at least one parking space is initiated upon any one of the following: a user approval submitted by way of the application; an automatic payment submitted upon parking the vehicle in the at least one parking space; an automatic payment after a pre-determined time interval in which the vehicle is parked in the at least one parking space.

5. The system of claim 2, the application further comprising a reservation feature by which the user may reserve the at least one parking space in advance.

6. The system of claim 1, further comprising the positional device being at least one of: a smartphone, smartwatch, tablet, built-in global positioning system, or portable global positioning system.

7. The system of claim 1, further comprising the positional device being at least one of: an electronically readable license plate, an electronically readable vehicle identification number tag, or an electronically readable tag affixed to or housed within the vehicle.

8. The system of claim 1, wherein the at least one sensory input device further comprises an ultra-wideband sensor positioned on a plurality of infrastructure points for triangulating the positional device.

9. The system of claim 1, further comprising the at least one sensory input device being an optical sensor configured for detection using at least one of: visual detection or passive infrared detection.

10. The system of claim 1, further comprising the at least one sensory input device being at least one of: an electromagnetic, microwave, radio wave, tomographic, or ultrasonic detector.

11. A method for pairing a user seeking a parking space to an available parking space, the method implemented by a central server platform comprising at least one server having at least one processor and at least one memory unit communicatively coupled with the processor, the at least one memory unit storing instructions which, when executed by the at least one processor, perform the method, the method comprising:

receiving a first one or more signals from at least one positional device, the at least one positional device located proximally to a user occupying a vehicle, the first one or more signals indicating an intention of a user to seek parking and further indicating a location of the positional device; wherein the location is determined through triangulation of the positional device with respect to a plurality of ultra-wideband sensors mounted on infrastructure points within a network of sensors to triangulate the position of the positional device relative to the parking spaces or the sensory devices themselves;

receiving a second one or more signals from at least one sensory input device positioned on an infrastructure point located proximally to at least one parking space, the second one or more signals indicating an availability of the at least one parking space; wherein the at least one sensory input device comprises an ultra-wideband sensor that distinguishes between occupied and unoccupied states by relaying information to the central server platform concerning whether the parking space is occupied or unoccupied;

determining from the second one or more signals, which of the one or more parking spaces are available to the user; wherein the determining is performed using predictive modeling of traffic and parking patterns implemented by a deep neural network comprising an input layer, one or more hidden layers with adjustable weighted connections wherein each node connects to another and has an associated weight and threshold, and an output layer, trained using stochastic learning with backpropagation that uses a gradient of a mathematical loss function to iteratively adjust neural network weights, the neural network trained to minimize false positives in parking availability predictions by performing an iterative training algorithm in which the neural network is retrained with an updated training set comprising false positives produced after initial training;

pairing the user with the at least one parking space based on the predictive modeling to optimize parking space allocation; and transmitting a notification of the pairing to the positional device; wherein the notification includes a route from a current location of the positional device to the at least one parking space or proposed route from a current location of the positional device to the at least one parking space displayed on the positional device along with the user's current location.

12. The method of claim 11, further comprising transmitting the notification of the pairing to the positional device by way of an application downloadable to the positional device.

13. The method of claim 12, further comprising displaying, by the application, a map feature, the map feature directing the vehicle from a present position to the at least one parking space.

14. The method of claim 12, further comprising receiving payment for parking by way of a payment feature in the application, where the payment for occupying the at least one parking space is initiated upon any one of the following: a user approval submitted by way of the application; an automatic payment submitted upon parking the vehicle in the at least one parking space; an automatic payment after a pre-determined time interval in which the vehicle is parked in the at least one parking space.

15. The method of claim 12, further comprising receiving, by the application, an advance user reservation of the at least one parking space.

16. The method of claim 12, further comprising the positional device being at least one of: a smartphone, smartwatch, tablet, built-in global positioning system, or portable global positioning system.

17. The method of claim 12, further comprising the positional device being at least one of: an electronically readable license plate, an electronically readable vehicle identification number tag, or an electronically readable tag affixed to or housed within the vehicle.

18. The method of claim 12, wherein the at least one sensory input device comprises an ultra-wideband sensor positioned for triangulating the positional device.

19. The method of claim 12, further comprising the at least one sensory input device being at least one of: a visual detector, a passive infrared detector, an electromagnetic, microwave, radio wave, tomographic, or ultrasonic detector.

20. A non-transitory computer-readable storage medium having embodied thereon instructions which, when executed by at least one processor, perform the steps of a method, the method comprising:

receiving, by a central server platform, a first one or more signals from at least one positional device, the at least one positional device located proximally to a user occupying a vehicle, the first one or more signals indicating an intention of a user to seek parking and further indicating a location of the positional device wherein the location is determined through triangulation of the positional device with respect to a plurality of ultra-wideband sensors mounted on infrastructure points within a network of sensors to triangulate the position of the positional device relative to the parking spaces or the sensory devices themselves;

receiving, by the central server platform, a second one or more signals from at least one sensory input device positioned on an infrastructure point located proximally to at least one parking space, the second one or more signals indicating an availability of the at least one parking space wherein the at least one sensory input device comprises an ultra-wideband sensor that distinguishes between occupied and unoccupied states by relaying information to the central server platform concerning whether the parking space is occupied or unoccupied;

determining, by the central server platform and from the second one or more signals, which of the one or more parking spaces are available to the user wherein the determining is performed using predictive modeling of traffic and parking patterns implemented by a deep neural network comprising an input layer, one or more hidden layers with weighted connections wherein each node connects to another and has an associated weight and threshold, and an output layer, the neural network trained using stochastic learning with backpropagation that uses a gradient of a mathematical loss function to adjust weights of the neural network based on data collected from positional devices and sensory input devices in parking areas to minimize false positives by performing an iterative training algorithm in which the neural network is retrained with an updated training set comprising false positives produced after initial training;

pairing, by the central server platform, the user with the at least one parking space based on the predictive modeling to optimize parking space allocation; and transmitting, by the central server platform, a notification of the pairing to the positional device wherein the notification includes a route from a current location of the positional device to the at least one parking space or proposed route from a current location of the positional device to the at least one parking space displayed on the positional device along with the user's current location.

* * * * *